US010518357B2

(12) United States Patent
Furuya (10) Patent No.: US 10,518,357 B2
(45) Date of Patent: Dec. 31, 2019

(54) MACHINE LEARNING DEVICE AND ROBOT SYSTEM TO LEARN PROCESSING ORDER OF LASER PROCESSING ROBOT AND MACHINE LEARNING METHOD THEREOF

(71) Applicant: FANUC CORPORATION, Yamanashi (JP)

(72) Inventor: Yoshitake Furuya, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 99 days.

(21) Appl. No.: 15/808,921

(22) Filed: Nov. 10, 2017

(65) Prior Publication Data

US 2018/0147665 A1 May 31, 2018

(30) Foreign Application Priority Data

Nov. 29, 2016 (JP) .................. 2016-231678

(51) Int. Cl.
*B23K 26/08* (2014.01)
*B23K 26/382* (2014.01)
*B23K 26/03* (2006.01)

(52) U.S. Cl.
CPC .......... *B23K 26/0884* (2013.01); *B23K 26/03* (2013.01); *B23K 26/032* (2013.01); *B23K 26/382* (2015.10)

(58) Field of Classification Search
None
See application file for complete search history.

(56) References Cited

U.S. PATENT DOCUMENTS

| 5,045,669 | A | * | 9/1991 | Ortiz, Jr. | ................ | B23K 26/03 |
| | | | | | | 219/121.61 |
| 7,129,438 | B2 | * | 10/2006 | Bates | .................... | B23K 26/03 |
| | | | | | | 219/121.63 |
| 2005/0107918 | A1 | | 5/2005 | Watanabe et al. | | |

FOREIGN PATENT DOCUMENTS

| CN | 1476951 A | 2/2004 |
| CN | 103282153 A | 9/2013 |
| CN | 103464344 A | 12/2013 |
| CN | 104010774 A | 8/2014 |
| CN | 104379308 A | 2/2015 |
| CN | 104889986 A | 9/2015 |
| CN | 105328699 A | 2/2016 |

(Continued)

OTHER PUBLICATIONS

Pineau et al., "High-level robot behavior control using POMDPs", American Association for Artificial Intelligence, 2002. (Year: 2002).*

(Continued)

*Primary Examiner* — Carlos R Ortiz Rodriguez
(74) *Attorney, Agent, or Firm* — Hauptman Ham, LLP (57) ABSTRACT

A machine device for learning a processing order of a laser processing robot, includes a state observation unit that observes, as a state variable, one of a plasma light from a laser processing point of the laser processing robot and a processing sound from the laser processing point of the laser processing robot; a determination data obtaining unit that receives, as determination data, a cycle time in which the laser processing robot completes processing; and a learning unit that learns the processing order of the laser processing robot based on an output of the state observation unit and an output of the determination data obtaining unit.

12 Claims, 8 Drawing Sheets

(56) References Cited

FOREIGN PATENT DOCUMENTS

| | | |
|---|---|---|
| JP | S62-114786 A | 5/1987 |
| JP | 10-039909 A | 2/1998 |
| JP | 2002-116817 A | 4/2002 |
| JP | 2005-108144 A | 4/2005 |
| JP | 2007-253197 A | 10/2007 |
| JP | 2012-509189 A | 4/2012 |
| JP | 5997330 B1 | 9/2016 |
| WO | 2015/185049 A1 | 12/2015 |
| WO | 2016/060716 A2 | 4/2016 |

OTHER PUBLICATIONS

Stork et al., "Multiple Sensors and Artificial Neural Networks in a Cognitive Technical System for Laser Welding", 2009 IEEE. (Year: 2009).*

You et al., "Multisensor Fusion System for Monitoring High-Power Disk Laser Welding Using Support Vector Machine", 2014 IEEE. (Year: 2014).*

\* cited by examiner

FIG. 10 ion. Note that,
MACHINE LEARNING DEVICE AND ROBOT SYSTEM TO LEARN PROCESSING ORDER OF LASER PROCESSING ROBOT AND MACHINE LEARNING METHOD THEREOF

RELATED APPLICATIONS

The present application claims priority to Japanese Patent Application No. 2016-231678 filed Nov. 29, 2016, the disclosure of which is hereby incorporated by reference herein in its entirety.

BACKGROUND OF THE INVENTION

1. Field of the Invention

The present invention relates to a machine learning device and a robot system to learn a processing order of a laser processing robot and a machine learning method thereof.

2. Description of the Related Art

In recent years, laser processing robots, which perform welding, cutting, drilling and other forms of processing are used in many areas. For example, one or more laser processing robots are used for welding (laser welding) automobile bodies.

An operator (a teacher, a human) adjusts laser processing conditions of such laser processing robots and the robots perform processing in accordance with the processing conditions and the processing order set by the operator. In other words, the teacher teaches welding parts, welding order and the like that allow, for example, a shortest cycle time.

It is, however, difficult for an operator to teach the welding parts, the welding order and the like that provide an optimal solution for achieving, for example, a shortest cycle time. Besides, when a plurality of laser processing robots are used, it is even more difficult to efficiently teach an optimal solution because the teaching is far more complicated than in the case with one laser processing robot used since the teaching indicates which robots perform welding on which parts in which order while ensuring that the robots do not interfere with each other.

Conventionally, Japanese Laid-Open Patent Publication No. H10(1998)-039909, for example, discloses an operation planning method to be applied to a plurality of robots to reduce work by introducing automatic planning of operations of a plurality of robots; according to the method a best solution not far from the optimal solution is easily and automatically arrived at in a practical time period by organizing operations into groups, deciding the order of operations and the allocation of the operations to the robots in groups, and thereby reducing the number of explorations of a solution as to the combination of the robots and the operations.

Conventionally, Japanese Laid-Open Patent Publication No. 2002-116817 discloses a method of allocating tasks to machines performing an operation consisting of tasks, the method enabling the allocation of tasks to the machines properly by applying an operation exploiting genetic algorithm to calculate the allocation of each task to the machines.

Further, conventionally, Japanese Laid-Open Patent Publication No. 2005-108144 discloses a correction data checking device to identify causes of failure by checking the teaching data given to the robot with the actual data during the actual operation period of the robot and classifying problems into those resulting from sensors and those resulting from workpieces or jigs.

As described above, conventionally, when welding automobile bodies with a laser processing robot, a human (operator) teaches the welding parts, the welding order, and the like. However, it is difficult to teach in such a way as to achieve, for example, a shortest cycle time and, further, when a plurality of laser processing robots are used, the teaching becomes more complicated and it is even more difficult to efficiently teach an optimal solution.

Further, for example, when automobile bodies are welded by one or more laser processing robots, it is difficult to efficiently teach an optimal solution even when the various proposed techniques are taken into consideration. Note that, although in the present description laser welding robots are described as an example of processing robots, it is needless to say that the laser processing robots may be other than laser welding robots and may include, for example, laser cutting robots.

In view of the disadvantages of the above-described conventional art, an object of the present invention is to provide a machine learning device and a robot system to learn a processing order of a laser processing robot and to efficiently teach an optimal solution and a machine learning method thereof.

SUMMARY OF INVENTION

According to a first aspect of the present invention, there is provided a machine learning device for learning a processing order of a laser processing robot, including a state observation unit that observes, as a state variable, one of a plasma light from a laser processing point of the laser processing robot and a processing sound from the laser processing point of the laser processing robot; a determination data obtaining unit that receives, as determination data, a cycle time in which the laser processing robot completes processing; and a learning unit that learns the processing order of the laser processing robot based on an output of the state observation unit and an output of the determination data obtaining unit.

The determination data obtaining unit may further receive, as the determination data, one of a processing speed at which the laser processing robot performs a laser processing, a focal length of laser, a posture of a processing tool, and a flow rate of assist gas. The machine learning device may further includes a decision unit that decides an operation of the laser processing robot based on the processing order of the laser processing robot that the learning unit has learned.

The learning unit may include a reward calculation unit that calculates a reward based on an output of the state observation unit and an output of the determination data obtaining unit; and a value function update unit that updates a value function that determines a value of a processing order of the laser processing robot based on an output of the state observation unit, an output of the determination data obtaining unit, and an output of reward calculation unit. The reward calculation unit may set a negative reward when the cycle time is long and set a positive reward when the cycle time is short.

The reward calculation unit may further set a negative reward when the plasma light from the laser processing point is far from an optimal plasma light value, and set a positive reward when the plasma light from the laser processing point is close to the optimal plasma light value, or the reward calculation unit may further set a negative reward when the processing sound from the laser processing point is far from an optimal processing sound value, and set a positive reward when the processing sound from the laser processing point is close to the optimal processing sound value. The reward calculation unit may further set a negative reward when the processing speed at which the laser processing robot performs laser processing is low, and set a positive reward when the processing speed at which the laser processing robot performs laser processing is high.

The machine learning device may further include a neural network. A plurality of machine learning devices may be respectively provided for a plurality of the laser processing robots, each machine learning device may be configured to communicate with at least one of the other machine learning devices and to mutually exchange or share a result of machine learning with the at least one machine learning device. The machine learning device may be located on a cloud server or a fog server.

According to a second aspect of the present invention, there is provided a robot system including a laser processing robot control device; a laser processing robot controlled by the laser processing robot control device; and a machine learning device according to the above described first aspect. The robot system may include a plurality of the laser processing robots, wherein the determination data obtaining unit may receive, as determination data, a system cycle time in which the plurality of the laser processing robots complete all processing in the system, and the learning unit may learn a processing order according to which the laser processing robots complete all processing in the system. The laser processing robot may include at least one of an optical sensor that detects the plasma light from the laser processing point of the laser processing robot within a certain wavelength range, and a sound sensor that detects the processing sound from the laser processing point of the laser processing robot within a certain frequency range.

According to a third aspect of the present invention, there is provided a machine learning method for learning a processing order of a laser processing robot, including observing, as a state variable, one of a plasma light from a laser processing point of the laser processing robot and a processing sound from the laser processing point of the laser processing robot; receiving, as determination data, a cycle time in which the laser processing robot completes processing; and learning a processing order of the laser processing robot based on the observed state variable and the received determination data.

According to a fourth aspect of the present invention, there is provided a method of monitoring a state of laser processing by a laser processing robot, including detecting a processing sound from a laser processing point during laser processing by the laser processing robot; extracting a certain frequency range from the processing sound from the laser processing point; and monitoring a state of laser processing by the laser processing robot based on the processing sound from the laser processing point within the extracted certain frequency range.

BRIEF DESCRIPTION OF THE DRAWINGS

The present invention will be understood more clearly by referring to the following accompanying drawings.

FIG. 1 is a diagram for describing a robot system to which the present invention is applied to;

DETAILED DESCRIPTION

Figure 1:
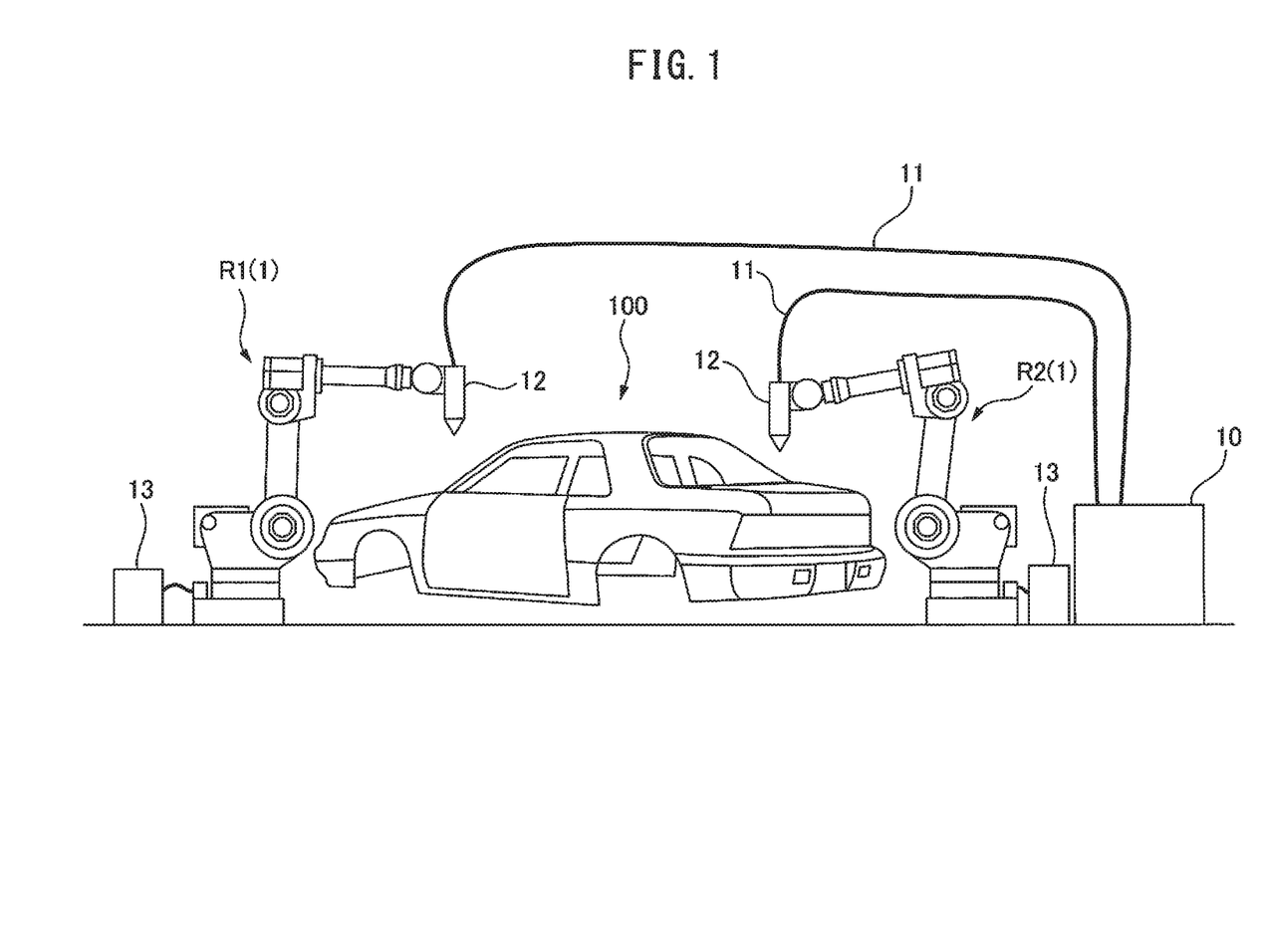

Hereinafter, embodiments of a machine learning device, a robot system, and a machine learning method will be described in detail with reference to the attached drawings. FIG. 1 is a diagram for describing a robot system to which the present invention is applied to and for describing a robot system with two laser processing robots performing laser welding on an automobile body.

FIG. 1 illustrates laser processing robots (robots) denoted by reference numeral 1 (R1, R2), a laser oscillator 10, optical fibers 11, processing tools (laser processing heads) 12, robot control units (laser processing robot control devices) 13, and an automobile body 100. The robots R1, R2 (1) are respectively controlled by the robot control units 13 to control, for example, the motions of the processing tools (laser processing heads) 12 attached to the front end units of the arms of the robots 1.

Laser beam (fiber laser beam) produced by the laser oscillator 10 is provided via optical fibers 11 to the processing tools 12 of respective robots 1 (R1, R2) to enable, for example, laser welding on the automobile body 100. Note that, although FIG. 1 illustrates two robots R1, R2 (1) performing laser welding on the automobile body 100, the welding may also be performed by one robot or three or more robots.

Figure 2:
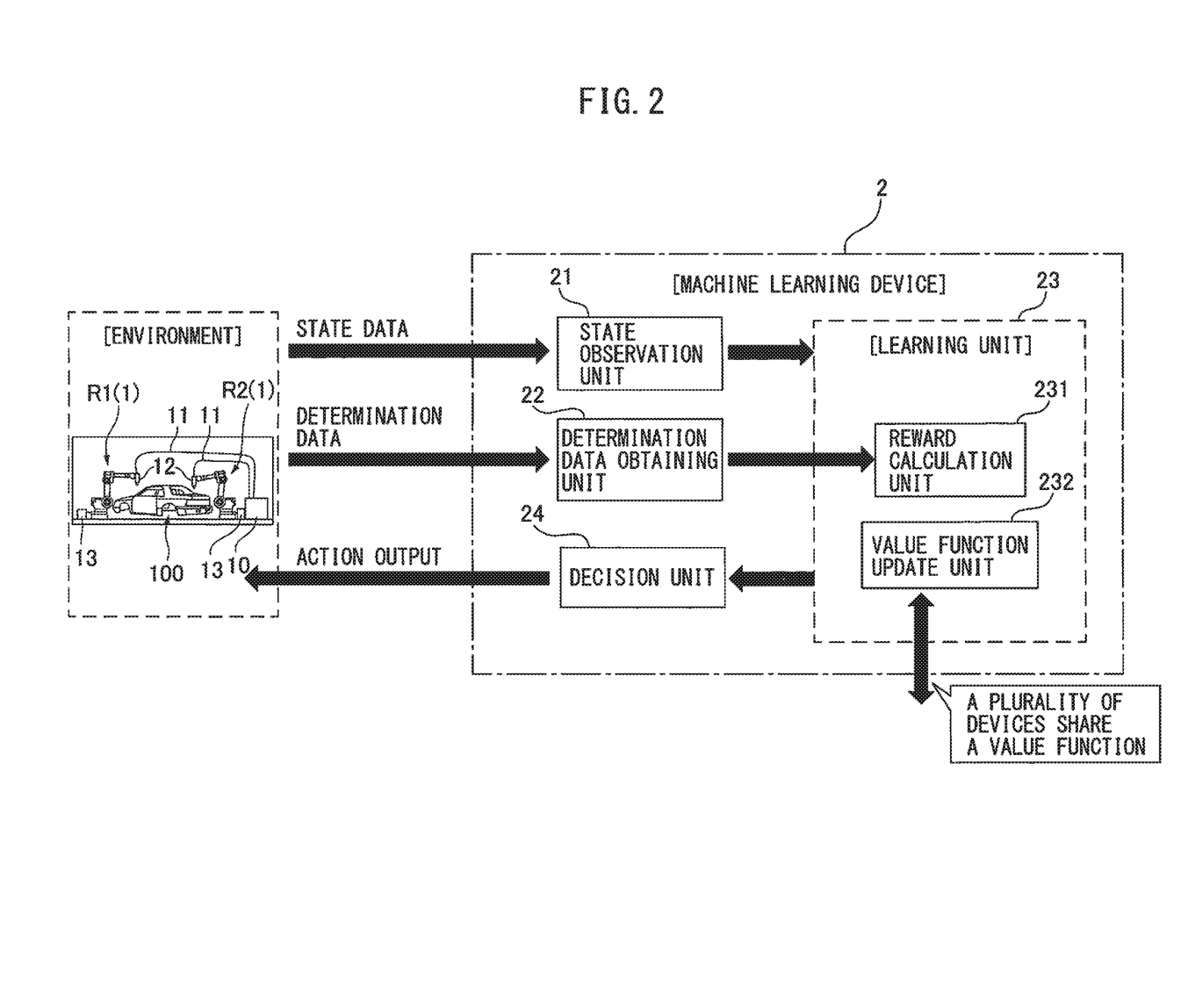
FIG. 2 is a block diagram illustrating an embodiment of a robot system according to the present invention.

FIG. 2 is a block diagram illustrating an embodiment of a robot system according to the present invention, and the robot system described above with reference to FIG. 1 is included in the environment 4. In other words, as illustrated in FIG. 2, the robot system according to the present embodiment includes the robots 1 (R1, R2), the laser oscillators 10, the optical fibers 11, the processing tools 12, and the robot control units 13 as described above with reference to FIG. 1 and a machine learning device 2.

A machine learning device 2 may be provided for each of the robots 1 (the robot control units 13, i.e., at the edge), or may be provided in a factory having a plurality of robots 1 (robot system) (for example, on a fog server) or on a cloud server connected with a plurality of factories via a telecommunication network such as the Internet. When a machine learning device is provided for each of the robots, each machine learning device may be configured to be communicate with at least one of the other machine learning devices and to mutually exchange or share results of machine learning with the at least one of the other machine learning devices.

Figure 3:
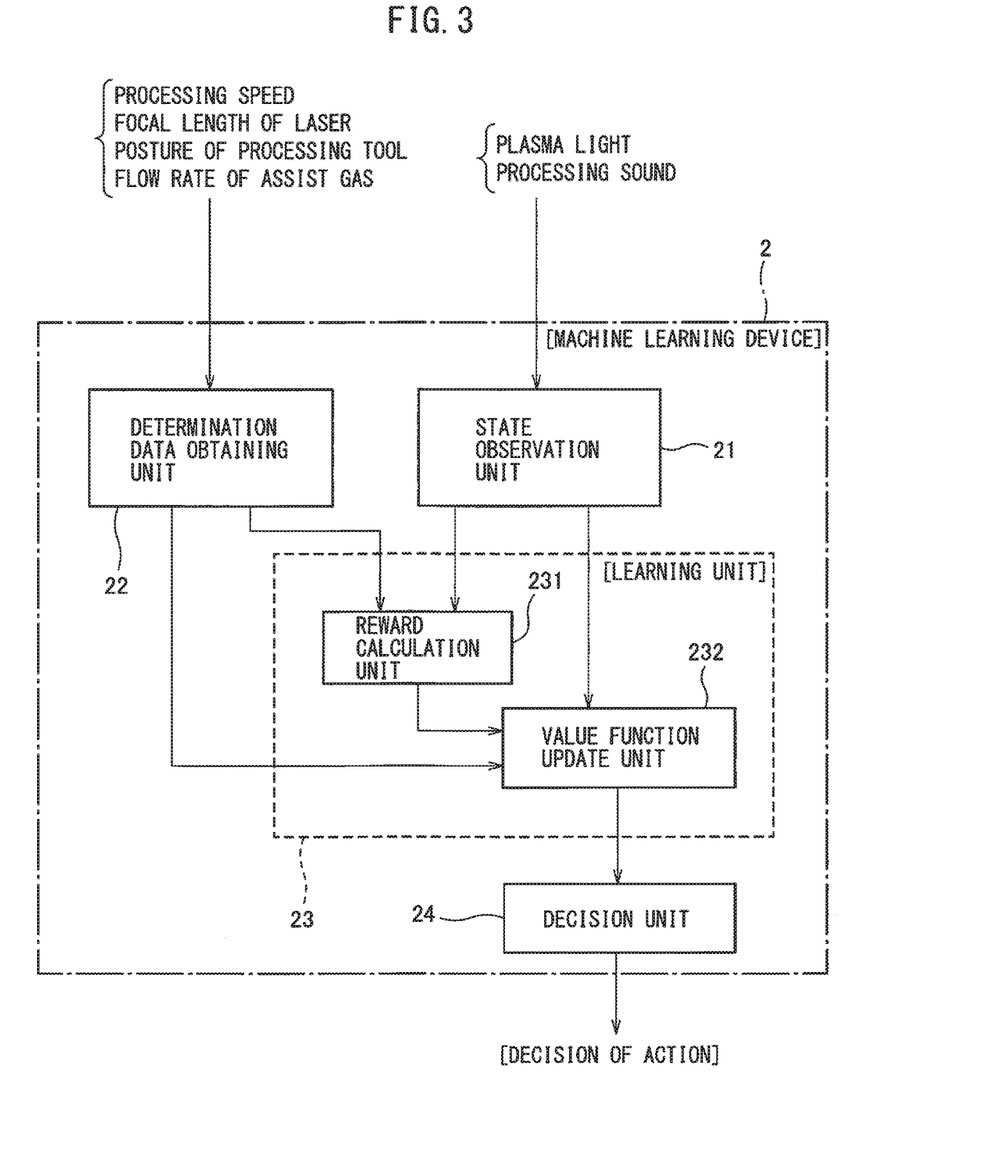
FIG. 3 is a block diagram illustrating an embodiment of a machine learning device according to the present invention.

FIG. 3 is a block diagram illustrating an embodiment of a machine learning device according to the present invention. As illustrated in FIG. 2 and FIG. 3, the machine learning device 2 according to the present embodiment performs reinforced learning and includes a state observation unit 21, a determination data obtaining unit 22, a learning unit 23, and a decision unit 24 and the learning unit 23 includes a reward calculation unit 231 and a value function update unit 232.

The state observation unit 21 observes, as a state variable, at least one of plasma light from a laser processing point of a robot (laser processing robot) 1 and processing sound from the laser processing point of the robot 1. Plasma light from the laser processing point is detected by an optical sensor (photo sensor) provided on, for example, the processing tool 12 attached to the front end unit of the arm of the robot 1 and processing sound from the laser processing point is detected by a sound sensor (microphone) provided on the processing tool 12. Detection of plasma light and processing sound from the laser processing point will be described later in detail with reference to FIG. 8A and FIG. 8B.

The determination data obtaining unit 22 receives, as determination data, a cycle time in which the robot 1 completes processing. When, for example, two robots 1 (R1, R2) perform laser welding as illustrated in FIG. 1, a duration in which the two robots complete the whole laser welding process may be treated as cycle time. The determination data obtaining unit 22 may also receive, as determination data, one of a processing speed (velocity) at which the robot 1 performs laser processing, a focal length of the laser, a posture of the processing tool 12, and a flow rate of the assist gas.

The learning unit 23 learns a processing order for the robots 1 based on an output of the state observation unit 21 and an output of the determination data obtaining unit 22 and includes a reward calculation unit 231 and a value function update unit 232. The reward calculation unit 231 calculates rewards based on an output of the state observation unit 21 and an output of the determination data obtaining unit 22, and the value function update unit 232 updates a value function for determining the value of a processing order of robots 1 based on an output of the state observation unit 21, an output of the determination data obtaining unit 22, and an output of the reward calculation unit 231. The decision unit 24 decides the operation of the robots 1 based on the processing order learned by the learning unit 23.

In other words, the reward calculation unit 231 sets, for example, a negative reward when the cycle time is long and a positive reward when the cycle time is short. The reward calculation unit 231 may set, for example, a negative reward when the plasma light from the laser processing point is far from an optimal plasma light value and a positive reward when the plasma light from the laser processing point is close to the optimal plasma light value, or may set a negative reward when the processing sound from the laser processing point is far from an optimal processing sound value and a positive reward when the processing sound from the laser processing point is close to the optimal processing sound value. Further, the reward calculation unit 231 may set a negative reward when the processing speed (V) at which the robot 1 performs laser processing is low and a positive reward when the processing speed at which the robot 1 performs laser processing is high.

The machine learning device 2 has a function of analyzing data sets inputted to the device, extracting useful rules, knowledge expression, judgement criteria, and the like contained in the data sets, and outputting a result of the judgement as well as learning the knowledge (machine learning). There are various techniques for machine learning, which may be roughly categorized into, for example, "supervised learning", "unsupervised learning", and "reinforcement learning". Furthermore, there is a technique called "deep learning" in which the machine learns to extract feature amounts per se for implementing these techniques.

The machine learning device 2 illustrated in FIG. 3 employs "reinforcement learning (Q-learning)". The machine learning device 2 may be implemented by a general purpose computer or processor but, for example, general-purpose computing on graphics processing units (GPGPU) or a large-scale PC cluster may be employed for processing at an even higher speed. The general outline of machine learning will be described below.

First, in "supervised learning", a large number of data sets of certain inputs and results (labels) are fed into a machine learning device, which learns features contained in these data sets and inductively acquires a model (error model) for estimating results from the inputs, i.e., their relationships. Supervised learning may be implemented, for example, using an algorithm such as a neural network as described below.

"Unsupervised learning" is a technique in which input data alone is fed into a machine learning device in a large amount, and the device learns distributions of the input data and, for example, compresses, classifies, and shapes the input data without corresponding teacher output data being fed into the device. This allows, for example, the clustering of similar features contained in these data sets. The obtained result may be used to define certain criteria, and by allocating outputs in such a manner that the outputs are optimized according to the criteria, it is possible to predict the outputs.

There is what is called semi-supervised learning, which exploits a problem setting characterized as being intermediate between unsupervised learning and supervised learning and this is a case in which, for example, only a part of the data is provided in the form of data sets of inputs and outputs while the remaining data consists of inputs alone.

Next, reinforcement learning will be described further in detail. First, a problem setting in reinforcement learning is considered as follows.

A robot system (i.e., a laser processing robot 1 and a laser processing robot control device (robot control unit, for example, including a machine learning device 2) 13) observes a state of the environment and decides an action.

The environment may change in accordance with some rule, and further, the robot system may change the environment by its own action.

A reward signal returns each time the action is taken.

It is the sum of (discounted) rewards in the future, which is desired to be maximized.

Learning starts in a state in which the result caused by the action is completely not known or only incompletely known. In other words, the robot controller may obtain the result as data only after it actually takes an action. In short, it is preferable to explore the optimum action by trial and error.

By setting a state in which learning (a technique, such as supervised learning as described above or inverse reinforcement learning) is performed in advance to mimic a human behavior as the initial state, learning may be started from a good starting point.

Reinforcement learning is a technique in which, not only by determination or classification but also by learning actions, an appropriate action is learned in consideration of the interaction provided by an action to environment, i.e., how to maximize the reward obtained in the future is learned. Hereinafter, description is continued with an example of Q-learning, but the present invention is not limited to Q-learning.

Q-learning is a method for learning a value Q(s, a) for selecting an action a in a certain environmental state s. In other words, in the certain state s, an action a with the highest value Q(s, a) may be preferably selected as the optimum action. However, at first, the correct value for the value Q(s, a) is completely not known for a pair of the state s and the action a.

Accordingly, an agent (action subject) selects various actions a under the certain state s and is given a reward for the action a at that time. Consequently, the agent learns to select a better action, i.e., a correct value Q(s, a).

Further, as a result of the action, it is desired to maximize the sum of the rewards obtained in the future, and it is aimed to finally satisfy Q(s, a)=E[Σγ$^t$r$_t$]. The expected value is assumed to be taken for the case when the state changes following the optimum action, and since it is not known, it is learned by making exploration. An update formula for such value Q(s, a) may be represented, for example, by equation (1) as follows:

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In the above equation (1), $s_t$ represents a state of the environment at a time t, and at represents an action at the time t. The action at changes the state to $s_{t+1}$. $r_{t+1}$ represents a reward that may be gained with the change of the state. Further, the term attached with max is the product of the Q-value multiplied by γ for the case where the action a with the highest Q-value known at that time is selected under the state $s_{t+1}$. γ is a parameter satisfying 0<γ≤1, and referred to as a discount rate. α is a learning factor, which is in the range of 0<α≤1.

The above equation (1) represents a method for updating the evaluation value Q($s_t$, $a_t$) of the action at in the state $s_t$, on the basis of the reward $r_{t+1}$ returned as a result of the action $a_t$. In other words, it is indicated that when sum of the reward $r_{t+1}$ and the evaluation value Q($s_{t+1}$, max $a_{t+1}$) of the best action max a in the state subsequent to the state s upon the action a is larger than the evaluation value Q($s_t$, $a_t$) of the action a in the state s, Q($s_t$, $a_t$) is increased; otherwise, Q($s_t$, $a_t$) is decreased. In other words, it is configured such that a value of a certain action in a certain state is made to be closer to the reward that is instantly returned as a result and the value of the best action in the subsequent state upon that action.

Methods of representing Q(s, a) on a computer include a method in which values of all state-action pairs (s, a) are held in the form of a table and a method in which a function approximating Q(s, a) is provided. In the latter method, the above equation (1) may be implemented by adjusting parameters of the approximation function using a technique, such as a stochastic gradient descent method. As the approximation function, a neural network described later may be used.

As an approximation algorithm for a value function in reinforcement learning, a neural network may also be used.

Figure 4:
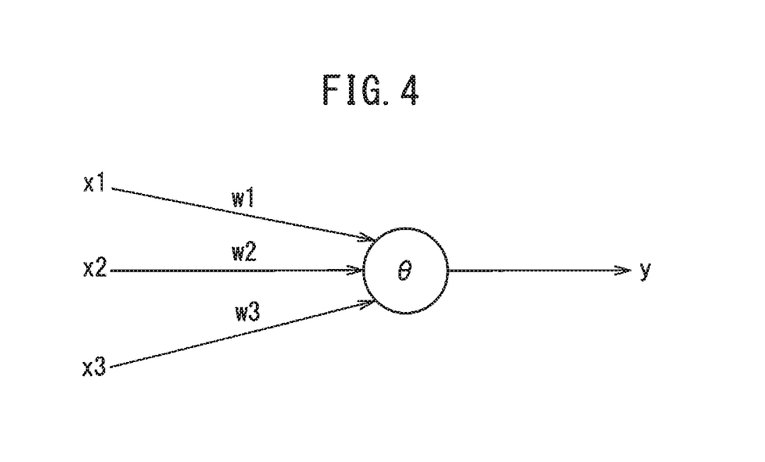
FIG. 4 is a schematic diagram of a neuron model.
Figure 5:
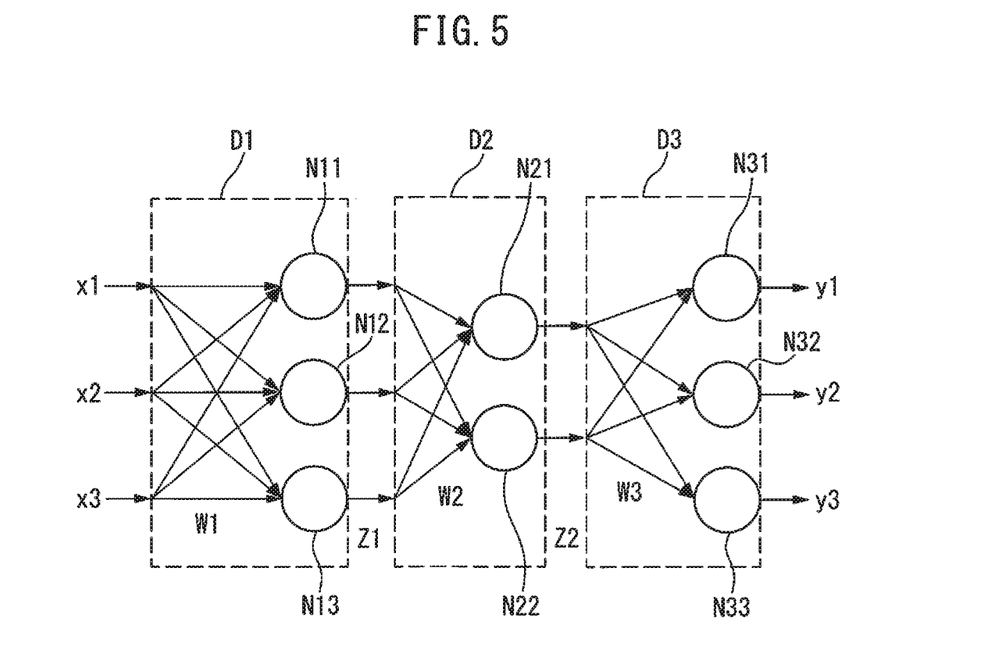
FIG. 5 is a schematic diagram of a neural network consisting of three layers, formed by combining neurons as illustrated in FIG. 4.

FIG. 4 is a diagram schematically illustrating a model for a neuron, and FIG. 5 is a diagram schematically illustrating a three-layer neural network formed by combining neurons as illustrated in FIG. 4. In other words, the neural network is configured, for example, of an arithmetic device simulating a model for a neuron as illustrated in FIG. 4, a memory, and the like.

As illustrated in FIG. 4, the neuron outputs an output (result) y for a plurality of inputs x (in FIG. 4, by way of example, inputs x1 to x3). Each of the inputs x (x1, x2, x3) is multiplied by a weight w (w1, w2, w3) corresponding to the input x. Thereby, the neuron outputs the result y represented by the following equation (2). Note that all of the input x, the result y, and the weight w are vectors. In the equation (2) below, θ is a bias, and $f_k$ is an activation function.

$$y = f_k(\Sigma_{i=1}^n x_i w_i - \theta) \quad (2)$$

Referring to FIG. 5, a description will be given of a three-layer neural network formed by a combination of neurons as illustrated in FIG. 4. As illustrated in FIG. 5, a plurality of inputs x (by way of example herein, inputs x1 to input x3) are inputted from the left side of the neural network, and a result y (by way of example herein, result y1 to input y3) is outputted from the right side. Specifically, the inputs x1, x2, and x3 are multiplied by a weight corresponding to each of three neurons N11 to N13 and inputted. The weights used to multiply these inputs are collectively denoted by W1.

The neurons N1 to N13 output z11 to z13, respectively. In FIG. 5, z11 to z13 are collectively referred to as a feature vector Z1, which may be regarded as a vector which is obtained by extracting feature values of the input vector. The feature vector Z1 is a feature vector defined between the weight W1 and the weight W2. z11 to z13 are multiplied by a weight corresponding to each of the two neurons N21 and N22 and inputted. The weights used to multiply these feature vectors are collectively denoted by W2.

The neurons N21 and N22 output z21 and z22, respectively. In FIG. 5, z21, z22 are collectively referred to as a feature vector Z2. The feature vector Z2 is a feature vector defined between the weight W2 and the weight W3. z21 and z22 are multiplied by a weight corresponding to each of the three neurons N31 to N33 and inputted. The weights used to multiply these feature vectors are collectively denoted by W3.

Finally, the neurons N31 to N33 output result y1 to result y3, respectively. The operation of the neural network includes a learning mode and a value prediction mode. For example, in the learning mode, the weight W is learned using a learning data set, and in the prediction mode, the action of the robot controller is determined using the parameters. Although reference is made to prediction for convenience, it is needless to say that various tasks, such as detection, classification, inference, and the like, are possible.

It is possible that the data obtained by actually operating the robot controller in the prediction mode is immediately learned to be reflected on the subsequent action (on-line learning) and also that a group of pre-collected data is used to perform collective learning and a detection mode is executed with the parameter since then (batch learning). An intermediate case is also possible, where a learning mode is interposed each time data is accumulated to a certain degree.

The weights W1 to W3 may be learned by an error backpropagation method. The error information enters from the right side and flows to the left side. The error back propagation method is a technique for adjusting (leaning)

each weight so as to reduce the difference between an output y when an input x is inputted and a true output y (teacher) for each neuron. Such a neural network may have three or more layers (referred to as deep learning). It is possible to extract features of the input step by step to automatically acquire an arithmetic device, which feeds back the results, from the teacher data alone.

As described with reference to FIG. 3, the machine learning device 2 according to the present example includes the state observation unit 21, the determination data obtaining unit 22, the learning unit 23, and the decision unit 24, for example, to perform Q-learning. Note that the machine learning method applied to the present invention is not limited to Q-learning, and as described above, the machine learning device 2 may be realized by adopting GPGPU, large-scale PC clusters or the like.

Figure 6A:
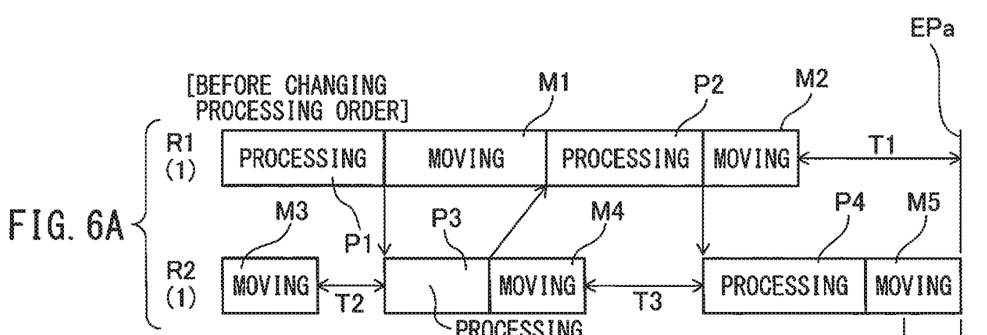
FIG. 6A and FIG. 6B are diagrams for describing an example of the relation between processing order and cycle time with two laser processing robots.
Figure 6B:
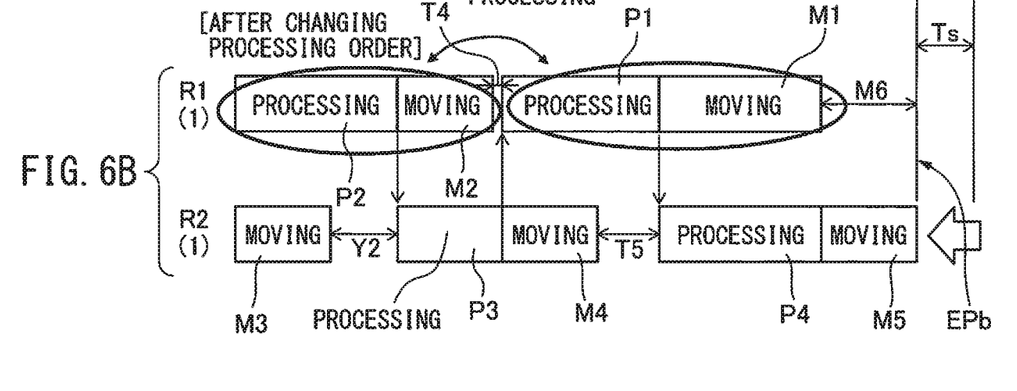

FIG. 6A and FIG. 6B are diagrams for describing an example of the relation between processing order and cycle time with two laser processing robots, FIG. 6A illustrating a processing order to be changed and FIG. 6B illustrating a processing order obtained by changing the processing order illustrated in FIG. 6A. Practicability of a change of a processing order may be confirmed by simulation. In FIG. 6A and FIG. 6B, the reference numerals P1 to P4 denote the periods (time) for processing (laser welding processes), M1 to M5 denote the periods for moving either of the processing tools (laser processing heads) 12 attached to the front end units of the arms of the robots 1 to certain positions, and T1 to T6 denote the stand-by periods in which one of the robots 1 neither performs processing nor moves its processing tool (laser processing head) 12.

As illustrated in FIG. 6A, before the processing order is changed, the first robot R1 operates in the order of P1→M1→P2→M2→T1, the second robot R2 operates in the order of M3→T2→P3→M4→T3→P4→M5, and the two robots R1 and R2 complete the whole processing at the time EPa. When "P1→M1" of the processing by the first robot R1 is changed for "P2→M2" as illustrated in FIG. 6B, for example, the first robot R1 operates in the order of P2→M2→T4→P1→M1→T6, the second robot R2 operates in the order of M3→T2→P3→M4→T5→P4→M5, and the two robots R1 and R2 complete the whole processing at the time EPb.

As is evident from the comparison between FIG. 6B and FIG. 6A, the two robots R1 and R2 together perform the same processing P1 to P4 and the same movements M1 to M5 but the total processing time (cycle time) may be reduced by Ts (Ts=EPa−EPb) by changing "P1→M1" for "P2→M2" in the processing order of the first robot R1. Although a simplified example is used in FIG. 6A and FIG. 6B, various factors make the processing more complicated in actual practice, and the machine learning device according to the present embodiment learns a processing order for such laser processing robots.

Figure 7:
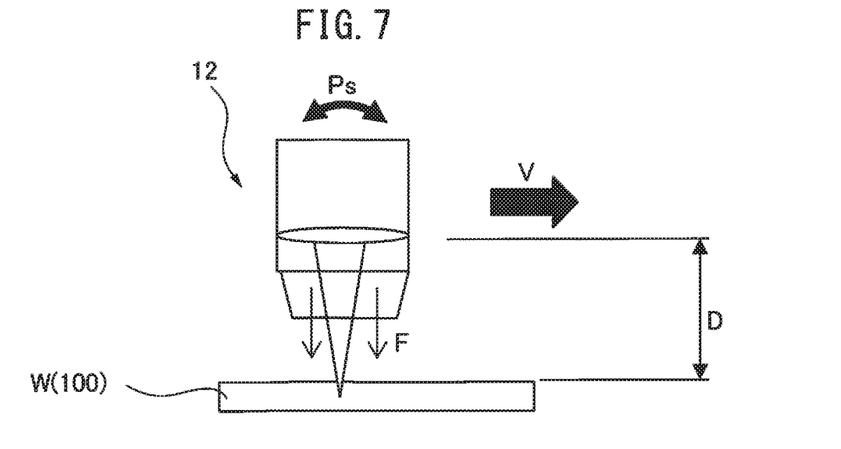
FIG. 7 is a diagram for describing a processing tool of a laser processing robot in a robot system according to the present invention.

FIG. 7 is a diagram for describing a processing tool of a laser processing robot in a robot system according to the present invention. A processing tool (laser processing head) 12 is attached, for example, to the front end unit of the arm of a robot (laser processing robot) 1 for performing laser processing (for example, laser welding) of a workpiece W (for example, an automobile body 100). Processing conditions of the processing tool 12, for example, processing speed V at which the processing tool 12 (laser processing robot 1) performs laser processing, focal length D of laser, posture Ps of the processing tool 12, and flow rate F of the assist gas are adjusted to optimal values. Processing speed V, focal length D, posture Ps, and flow rate F may be respectively calculated from outputs of known processing-monitor sensors.

As will be described later in detail with reference to the flow charts illustrated in FIG. 9 and FIG. 10, the processing conditions may be adjusted in such a way that the outputs of the processing-monitor sensors present optimal values; for example, the reward calculation unit 231 of the learning unit 23 of the above-described machine learning device 2 sets a negative reward when the processing time of a robot 1 (system cycle time) is long and a positive reward when the cycle time is short. The reward calculation unit 231 may set a negative reward when an output of a processing-monitor sensor is far from an optimal value and a positive reward when an output of a processing-monitor sensor is close to an optimal value. Further, the reward calculation unit 231 may set a negative reward when the processing speed V at which the robot 1 performs laser processing is low and a positive reward when the processing speed at which the robot 1 performs laser processing is high.

Figure 8A:
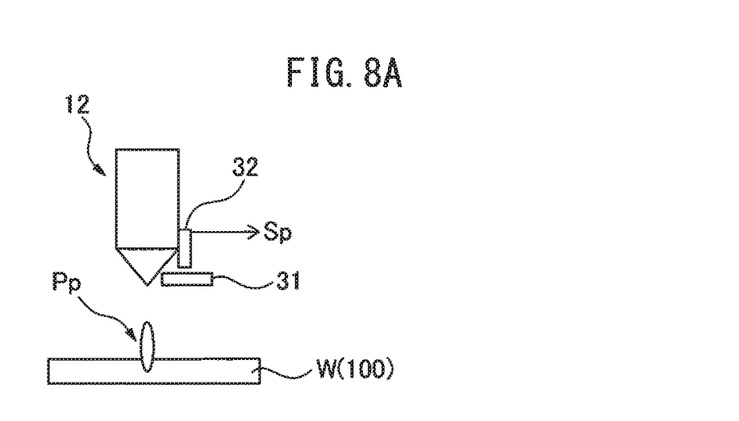
FIG. 8A and FIG. 8B are diagrams for describing an observation of a state of laser processing by a laser processing robot in a robot system according to the present invention.
Figure 8B:
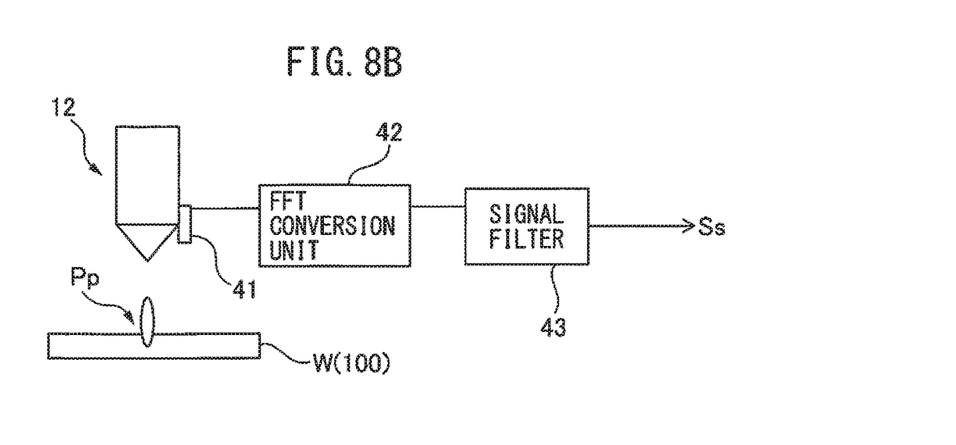

FIG. 8A and FIG. 8B are diagrams for describing an observation of a state of laser processing by a laser processing robot in the robot system according to the present invention, FIG. 8A illustrating an observation of plasma light from a laser processing point and FIG. 8B illustrating an observation of processing sound from a laser processing point.

As illustrated in FIG. 8A, the processing tool (laser processing head) 12 is provided with an optical filter 31 to transmit the light within a certain wavelength range and a photo sensor (optical sensor) 32, to detect plasma light from the laser processing point Pp within a certain wavelength range and to output a signal Sp. Processing conditions (for example, processing speed V, laser output, and the like) may be changed in such a way that the detection signal Sp falls within a range between a preselected lower limit value and a preselected upper limit value (preselected lower limit value<Sp<preselected upper limit value).

As illustrated in FIG. 8B, the processing tool 12 is provided with a sound-detecting microphone (sound sensor) 41 to detect processing sound from the laser processing point Pp. The output from the microphone 41 undergoes Fast Fourier Transform (FFT) in an FFT conversion unit 42, and the signal filter unit 43 outputs a detection signal Ss within a certain frequency range. Processing conditions (for example, processing speed V, laser output, and the like) may be changed in such a way that the detection signal Ss falls within a range between a preselected lower limit value and a preselected upper limit value (preselected lower limit value<Ss<preselected upper limit value).

A possible technique for monitoring the state of laser processing by the laser processing robot 1 is to detect processing sound from the laser processing point Pp during the laser processing by the robot 1, to extract a certain frequency range of the processing sound from the laser processing point Pp, and to monitor the state of laser processing by the robot 1 based on the processing sound from the laser processing point Pp within the extracted certain frequency range.

Figure 9:
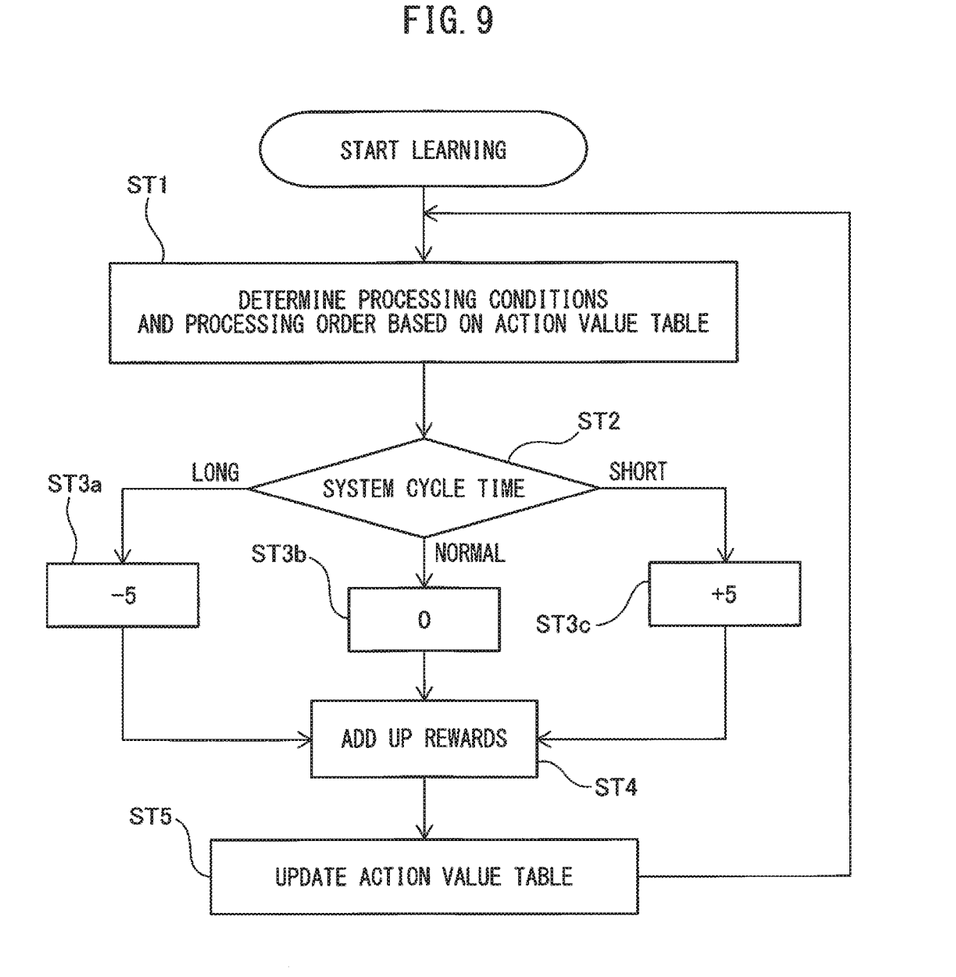
FIG. 9 is a flow chart illustrating an example of processing in the machine learning device illustrated in FIG. 3.

FIG. 9 is a flow chart illustrating an example of processing in the machine learning device illustrated in FIG. 3. As illustrated in FIG. 9, after the machine learning is started (start learning), processing conditions and processing order are determined based on an action value table in Step ST1 and then the system cycle time is evaluated in Step ST2. The action value table in default setting is prepared in advance based on the past experiences, results from dummy operations, or the like.

When the system cycle time is determined as long in Step ST2, a negative reward (−5) is set in Step ST3a; when the system cycle time is determined as normal, a zero reward (0) is set in Step ST3b; and when the system cycle time is determined as short, a positive reward (+5) is set in ST3c.

Further, in Step ST4, the rewards set in the Steps ST3a to ST3c are added up and the action value table is updated in Step ST5, then the same process is repeated from Step ST1.

Figure 10:
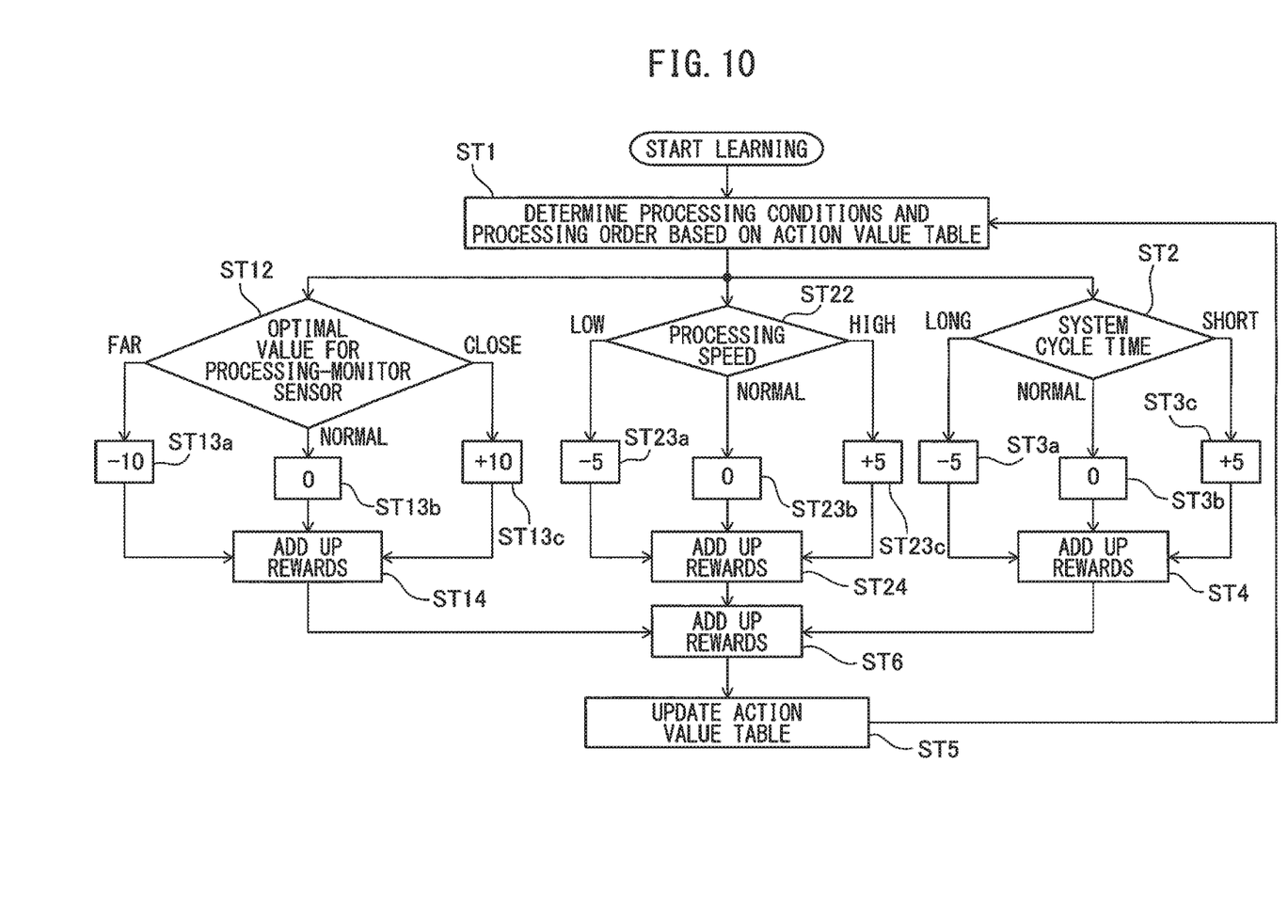
FIG. 10 is a flow chart illustrating another example of processing in the machine learning device illustrated in FIG. 3.

FIG. 10 is a flow chart illustrating another example of processing in the machine learning device illustrated in FIG. 3, wherein a determination based on an output of a processing-monitor sensor and a determination based on processing speed are added to the above-described flow chart in FIG. 9. As illustrated in FIG. 10, after the machine learning is started (start learning), processing conditions and processing order are determined based on an action value table in Step ST1 and the processes in the Steps ST2, ST12, and ST22 are performed.

In other words, in Step ST12, the output of the processing-monitor sensor is determined against the optimal value. More specifically, for example, when the value of the plasma light from the laser processing point, which is outputted from the photo sensor, is determined as far from the optimal value (optimal plasma light value) in Step ST12, a negative reward (−10) is set in Step ST13a; when the plasma light from the laser processing point is determined as normal, a zero reward (0) is set in Step ST13b; and when the plasma light from the laser processing point is determined as close to the optimal plasma light value, a positive reward (+10) is set in Step ST13c. The rewards set in Steps ST13a to ST13c are added up in Step ST14, then the processing proceeds to Step ST6.

Alternatively, when the processing sound from the laser processing point is determined as far from the optimal value (optimal processing sound value) in Step ST12, for example, a negative reward (−10) is set in Step ST13a; when the processing sound from the laser processing point is determined as normal, a zero reward (0) is set in Step ST13b; and when the processing sound from the laser processing point is determined as close to the optimal processing sound value, a positive reward (+10) is set in Step ST13c. The rewards set in Steps ST13a to ST13c are added up in Step ST14, then the processing proceeds to Step ST6.

Further, in Step ST22, the processing speed at which the robot (laser processing robot) performs laser processing is determined. In other words, when the processing speed is determined as low in Step ST22, a negative reward (−5) is set in Step ST23a; when the processing speed is determined as normal, a zero reward (0) is set in Step ST23b; and when the processing speed is determined as high, a positive reward (+5) is set in Step ST23c. The rewards set in Steps ST23a to ST23c are added up in Step ST24, then the processing proceeds to Step ST6.

Steps ST2, ST3a to ST3c, and ST4 are as described with reference to FIG. 9 and the rewards set in Steps ST3a to ST3c are added up in Step ST4, then the processing proceeds to Step ST6. The rewards added up respectively in Steps ST14, ST24, and ST4 are further added up in Step ST6, the action value table is updated in Step ST5, then the same process is repeated from Step ST1.

The rewards described above have values weighted according to respective determination criteria but the values of the rewards may be changed to other values as appropriate. In other words, the determination in Step ST12 of the output of the processing-monitor sensor against the optimal value is more heavily weighted ("−10, 0, +10") while the determination in Step ST22 of the processing speed at which the laser processing robot performs laser processing and the determination in Step ST2 of system cycle time (cycle time) are weighted equally ("−5, 0, +5") but these values may be changed. Further, for each determination criterion the positive reward and the negative reward may be different in their absolute values, or all the criteria may be equally weighted.

As described above in detail, the robot system and the machine learning method according to the present embodiment enable a processing order of a laser processing robot to be learned and an optimal solution to be efficiently taught. This reduces the processing time (cycle time) of the laser processing robot and enables processing under optimal processing conditions. It is needless to say that the present embodiment may be widely applied not only to robots performing laser welding but also those performing laser cutting and other forms of laser processing.

A machine learning device, a robot system, and a machine learning method according to the present invention have advantageous effects of learning a processing order for laser processing robots and efficiently teaching an optimal solution.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A machine learning device for learning a processing order of a robot system which includes a plurality of laser processing robots and the plurality of laser processing robots complete all processing in the system, comprising:
   a processor that
      observes, as a state variable, one of a plasma light from a laser processing point of each of the laser processing robots and a processing sound from the laser processing point of each of the laser processing robots,
      receives, as determination data, a system cycle time in which the plurality of laser processing robots complete all processing in the system, and
      learns a processing order of the robot system including the plurality of laser processing robots based on the state variable and the determination data.

2. The machine learning device according to claim 1, wherein
   the processor further receives, as the determination data, one of a processing speed at which each of the laser processing robots performs a laser processing, a focal length of laser, a posture of a processing tool, and a flow rate of assist gas.

3. The machine learning device according to claim 1 wherein
   the processor further decides an operation of the laser processing robot based on the processing order of the robot system including the plurality of laser processing robots that the processor has learned.

4. The machine learning device according to claim 1, wherein
the processor:
calculates a reward based on the state variable and of the determination data, and
updates a value function that determines a value of a processing order of the robot system including the plurality of laser processing robots based on the state variable, the determination data, and the reward.

5. The machine learning device according to claim 4, wherein
the processor sets a negative reward when the system cycle time is long and sets a positive reward when the system cycle time is short.

6. The machine learning device according to claim 4, wherein
the processor further sets a negative reward when the plasma light from the laser processing point is far from an optimal plasma light value, and sets a positive reward when the plasma light from the laser processing point is close to the optimal plasma light value, or
the processor further sets a negative reward when the processing sound from the laser processing point is far from an optimal processing sound value, and sets a positive reward when the processing sound from the laser processing point is close to the optimal processing sound value.

7. The machine learning device according to claim 4, wherein
the processor further sets a negative reward when the processing speed at which each of the laser processing robots performs laser processing is low, and sets a positive reward when the processing speed at which each of the laser processing robots performs laser processing is high.

8. The machine learning device according to claim 1, further comprising a neural network.

9. The machine learning device according to claim 1, wherein the machine learning device is located on a cloud server or a fog server.

10. A robot system, comprising:
a laser processing robot control device;
a plurality of laser processing robots controlled by the laser processing robot control device; and
a machine learning device for learning a processing order of the plurality of laser processing robots which complete all processing in the system,
the machine learning device comprising a processor that
observes, as a state variable, one of a plasma light from a laser processing point of each of the laser processing robots and a processing sound from the laser processing point of each of the laser processing robots,
receives, as determination data, a system cycle time in which the plurality of laser processing robots complete all processing in the system, and
learns a processing order of the robot system including the plurality of laser processing robots based on the state variable and the determination data.

11. The robot system according to claim 10, each of the laser processing robots comprising at least one of:
an optical sensor that detects the plasma light from the laser processing point of the laser processing robot within a certain wavelength range, and
a sound sensor that detects the processing sound from the laser processing point of the laser processing robot within a certain frequency range.

12. A machine learning method for learning a processing order of a robot system which includes a plurality of laser processing robots and the plurality of laser processing robots complete all processing in the system, comprising:
observing, as a state variable, one of a plasma light from a laser processing point of each of the laser processing robots and a processing sound from the laser processing point of each of the laser processing robots;
receiving, as determination data, a system cycle time in which the plurality of laser processing robots complete all processing in the system; and
learning a processing order of the robot system including the plurality of laser processing robots based on the observed state variable and the received determination data.

* * * * *